US011473926B2

(12) United States Patent
Deng et al.

(10) Patent No.: US 11,473,926 B2
(45) Date of Patent: Oct. 18, 2022

(54) METHOD AND APPARATUS FOR DISPLAYING ROAD NAMES, AND STORAGE MEDIUM

(71) Applicant: Baidu Online Network Technology (Beijing) Co., Ltd., Beijing (CN)

(72) Inventors: Jian Deng, Beijing (CN); Jing Zhang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 890 days.

(21) Appl. No.: 16/146,313

(22) Filed: Sep. 28, 2018

(65) Prior Publication Data
US 2019/0033091 A1 Jan. 31, 2019

Related U.S. Application Data

(63) Continuation of application No. PCT/CN2016/097415, filed on Aug. 30, 2016.

(30) Foreign Application Priority Data

Mar. 31, 2016 (CN) .......................... 201610202440.4

(51) Int. Cl.
*G01C 21/36* (2006.01)
*G06F 40/169* (2020.01)
*G06T 11/60* (2006.01)

(52) U.S. Cl.
CPC ....... *G01C 21/3673* (2013.01); *G06F 40/169* (2020.01); *G06T 11/60* (2013.01); *G06T 2210/21* (2013.01)

(58) Field of Classification Search
CPC .......... G09G 2340/045; G01C 21/3697; G01C 21/3667; G01C 21/367; G01C 21/3407;
(Continued)

(56) References Cited

U.S. PATENT DOCUMENTS 6,122,593 A 9/2000 Friederich et al.
6,154,219 A 11/2000 Wiley et al.
(Continued)

FOREIGN PATENT DOCUMENTS

CN 1821718 A 8/2006
CN 101647048 A 2/2010
(Continued)

OTHER PUBLICATIONS

International Search Report dated Jan. 5, 2017 for International Application No. PCT/CN2016/097415, 9 pages.
(Continued)

*Primary Examiner* — Jelani A Smith
*Assistant Examiner* — Paul A Castro
(74) *Attorney, Agent, or Firm* — Knobbe Martens Olson & Bear LLP

(57) ABSTRACT

A method and apparatus for displaying road names and a storage medium, the method comprises: performing collision detecting on and loading planned road names according to planned road name data and priority levels of the planned road names included in a navigation route; and performing collision detecting on and loading annotations of other map contents except the navigation route in a navigation map. The method and apparatus for displaying road names and the storage medium are used to enable a user to view the planned road names of the navigation route on an overview page of the navigational route, thereby improving guidance of map display for navigation.

7 Claims, 4 Drawing Sheets

(58) Field of Classification Search
CPC ............. G01C 21/3673; G05D 1/0278; G05D
1/0274; G08G 1/09626; G08G 1/205;
B60W 2556/50; B60W 2050/0078; B60W
2050/046; B60W 2554/4041; G06F
16/29; G06F 3/04842; G06F 3/04847;
G06F 40/169; H04W 4/029; H04W
4/024; H04W 4/90; G01S 13/391; G01S
19/42; G01S 17/931; G01S 19/17; G01S
2013/9322; G01S 2205/006; G06T 11/60;
G06T 2200/24; G06T 2210/21
See application file for complete search history.

(56) References Cited

U.S. PATENT DOCUMENTS

| | | | |
|---|---|---|---|
| 6,249,742 B1 | 6/2001 | Friederich et al. | |
| 6,565,610 B1 | 5/2003 | Wang et al. | |
| 8,055,442 B2 | 11/2011 | Kim | |
| 8,255,150 B2 | 8/2012 | Doan et al. | |
| 8,335,645 B2 | 12/2012 | Sakamoto | |
| 9,052,212 B2 | 6/2015 | Doan et al. | |
| 2005/0143914 A1* | 6/2005 | Yamada | G09B 29/106 340/995.27 |
| 2006/0195255 A1 | 8/2006 | Kim | |
| 2008/0097692 A1 | 4/2008 | Motohiro et al. | |
| 2009/0024319 A1* | 1/2009 | Tsuji | G01C 21/3673 701/533 |
| 2009/0153563 A1* | 6/2009 | Tudose | G09B 29/007 345/467 |
| 2010/0168997 A1 | 7/2010 | Sakamoto | |
| 2010/0241975 A1* | 9/2010 | Kinugawa | G09B 29/106 715/764 |
| 2010/0268448 A1 | 10/2010 | Doan et al. | |
| 2012/0283946 A1 | 11/2012 | Doan et al. | |
| 2015/0088415 A1* | 3/2015 | Kato | G06F 16/29 701/454 |
| 2015/0187337 A1* | 7/2015 | Baxter | G06F 3/0481 345/660 |
| 2016/0042722 A1 | 2/2016 | Miyamoto et al. | |
| 2016/0071298 A1 | 3/2016 | Liu et al. | |
| 2018/0301111 A1* | 10/2018 | Park | G09B 29/007 |

FOREIGN PATENT DOCUMENTS

| | | | |
|---|---|---|---|
| CN | 101853603 A | | 10/2010 |
| CN | 102538815 A | | 7/2012 |
| CN | 103162705 A | | 6/2013 |
| CN | 103165015 A | | 6/2013 |
| CN | 103185582 A | | 7/2013 |
| CN | 103915036 A | | 7/2014 |
| CN | 104252529 A | | 12/2014 |
| CN | 105890614 A | | 8/2016 |
| CN | 105893632 A | | 8/2016 |
| CN | 111309201 A | * | 6/2020 |
| EP | 1548406 A1 | | 6/2005 |
| EP | 2017579 A2 | | 1/2009 |
| JP | H0996540 A | | 4/1997 |
| JP | 2006-330112 A | | 12/2006 |
| JP | 2008-096865 A | | 4/2008 |
| JP | 2009036712 A | | 2/2009 |

OTHER PUBLICATIONS

Written Opinion of the International Searching Authority dated Jan. 5, 2017 for International Application No. PCT/CN2016/097415, 4 pages.
European Office Action dated Mar. 29, 2022 for European Patent Application No. 16896458.3.

* cited by examiner performing collision detecting on and loading planned road names according to planned road name data and priority levels of the planned road names included in a navigation route — S110 performing collision detecting on and loading annotations of other map contents except the navigation route in a navigation map — S120

METHOD AND APPARATUS FOR DISPLAYING ROAD NAMES, AND STORAGE MEDIUM

CROSS-REFERENCE TO RELATED APPLICATION

This application is a continuation of International Application PCT/CN2016/097415, with an international filing date of Aug. 30, 2016, which claims the priority from Chinese Application No. 201610202440.4, filed on Mar. 31, 2016 by Baidu Online Network Technology (Beijing) Co., Ltd., entitled "Method and Apparatus for Displaying Road Names," the entire disclosure of which is hereby incorporated by reference.

TECHNICAL FIELD

Embodiments of the present disclosure relate to the field of intelligent transportation technology, and specifically to a method and apparatus for displaying road names and a storage medium.

BACKGROUND

An existing navigation apparatus is provided with an intelligent type electronic map therein, and possesses route planning and navigation functions. A user only needs to input a name of a destination desired to reach or coordinates into the navigation apparatus, or directly click at a specific position on the electronic map, the navigation apparatus will plan a navigation route according to a measured current position and a geographical position of the destination inputted by the user, and give voice messages to guide the user to go to the destination in accordance with the planned navigation route.

However, a problem that a navigation map cannot reasonably display names of roads within the current map is always a big conundrum in the navigation industry. For the problem, existing techniques put forward a method including: extracting all road names from map data of the navigation map; filtering out some of road names having low priority levels according to a scale of the current map and priority levels of the road names; and drawing and displaying all the rest of the road names onto the navigation map.

However, due to this method, road names concerned with by users may not be displayed on the navigation map, especially on an overview page of the navigation route. As shown in FIG. 1, since road names displayed in a map are limited, names of planned roads I11, I12 and I13 in a navigation route are filtered out due to relatively lower priority levels, and thus fail to be displayed on the navigation map.

SUMMARY

Embodiments of the present disclosure provide a method and apparatus for displaying road names and a storage medium, to enable a user to view planned road names of a navigation route on an overview page of the navigational route, thereby improving guidance of map display for navigation.

The embodiments of the present disclosure adopt the following technical solutions.

In a first aspect, the embodiments of the present disclosure provide a method for displaying road names, comprising:

performing collision detecting on and loading planned road names according to planned road name data and priority levels of the planned road names included in a navigation route; and performing collision detecting on and loading annotations of other map contents, wherein the other map contents are map contents in a navigation map except the navigation route.

In a second aspect, the embodiments of the present disclosure provide an apparatus for displaying road names, comprising:

a planned road name loading module, configured to perform collision detecting on and load planned road names according to planned road name data and priority levels of the planned road names included in a navigation route; and an other annotation loading module, configured to perform collision detect on and loading annotations of other map contents, wherein the other map contents are map contents in a navigation map except the navigation route.

In a third aspect, the embodiments of the present disclosure provide a storage medium comprising computer executable instructions, wherein the computer executable instructions, when executed by a computer processor, execute a method for displaying road names, comprising:

performing collision detecting on and loading planned road names according to planned road name data and priority levels of the planned road names included in a navigation route; and performing collision detecting on and loading annotations of other map contents, wherein the other map contents are map contents in a navigation map except the navigation route.

According to the technical solutions provided in the embodiments of the present disclosure, collision detecting and loading are first performed on planned road names in a navigation route, and collision detecting and loading are then performed on annotations of other map contents, which ensures the display for the planned road names in a navigation map, and solves a problem concerned with by users that the planned road names may not be displayed on the navigation map, thereby improving guidance of map display for navigation.

BRIEF DESCRIPTION OF THE DRAWINGS

To describe the technical solutions in the embodiments of the present disclosure more clearly, the drawings that need to be used in the embodiments are briefly introduced. Clearly, the drawings in the following description are merely some embodiments of the present disclosure, and those of ordinary skill in the art may further make modifications and replacements to these drawings without creative efforts.

DETAILED DESCRIPTION OF EMBODIMENTS

The technical solutions in the embodiments of the present disclosure are described clearly and completely below with reference to the accompanying drawings. Evidently, the described embodiments are only some rather than all embodiments of the present disclosure, and are used for explaining the principle of the present disclosure, but are not intended to limit the present disclosure. On the basis of the embodiments in the present disclosure, all other embodiments acquired by those of ordinary skill in the art without creative efforts shall belong to the protection scope of the present disclosure.

First Embodiment

Figures 1, 2:
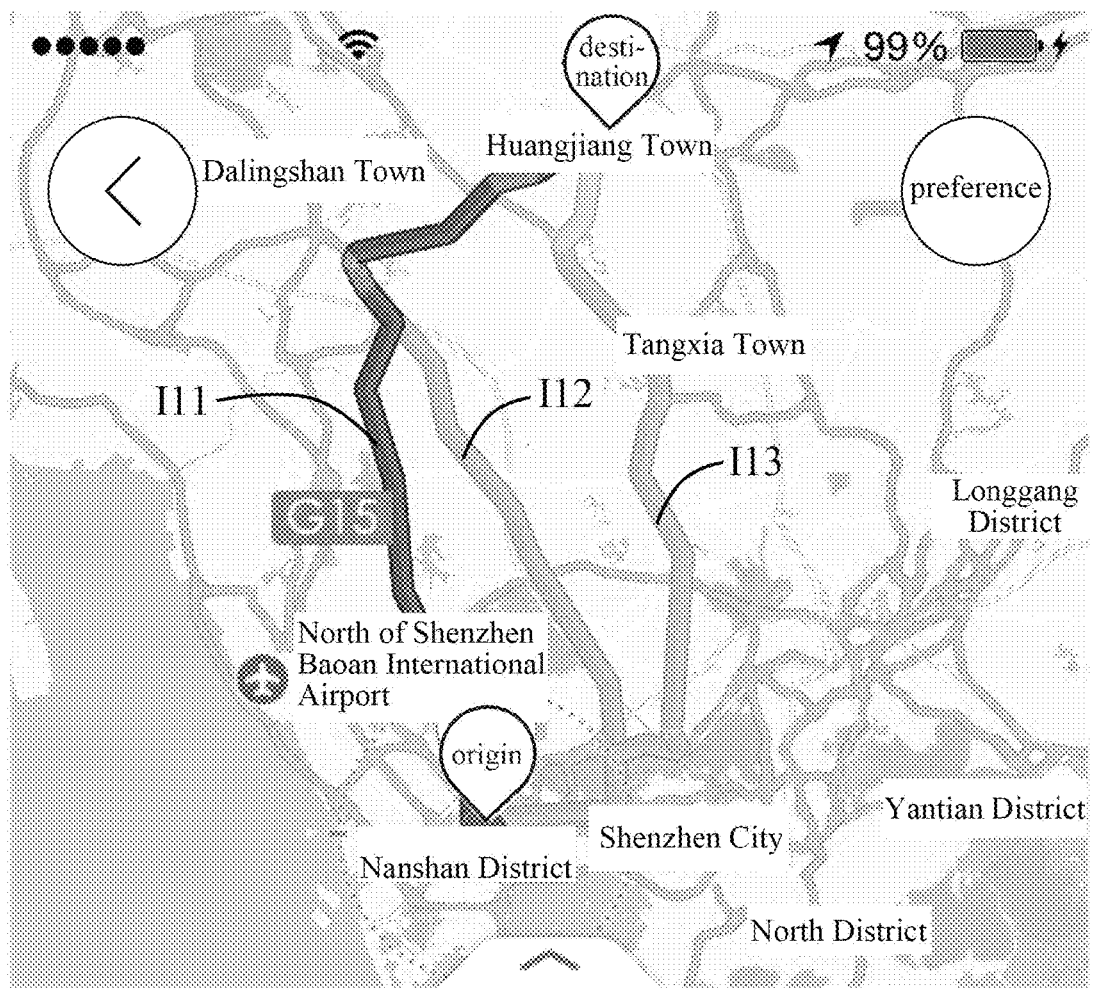
FIG. 1 is a schematic diagram of a display effect of road names in an existing technique.
FIG. 2 is a flowchart of a method for displaying road names provided by a first embodiment of the present disclosure.

FIG. 2 is a flowchart of a method for displaying road names provided by a first embodiment of the present disclosure. This embodiment may be suitable for a situation in which annotations for map contents are loaded in a navigation process. The method may be performed by an apparatus for displaying road names, and this apparatus may be implemented by means of hardware and/or software. Referring to FIG. 2, the method for displaying road names provided by this embodiment includes the following steps.

S110, performing collision detecting on and loading planned road names according to planned road name data and priority levels of the planned road names included in a navigation route.

The planned road name data may include at least one of the planned road names and coordinate regions of the planned road names. The priority levels of the planned road names may be preset according to hierarchies of roads, or may also be set as required by a user. After the navigation route is successfully planned, planned road name data and the priority levels of the planned road names included in the navigation route may be acquired. Next, the collision detecting may be performed on the planned road names according to the coordinate regions of the planned road names and the priority levels of the planned road names, and the planned road names are loaded onto the navigation map according to a result of the collision detecting.

S120, performing collision detecting on and loading annotations of other map contents, wherein the other map contents are map contents in a navigation map except the navigation route.

The annotations of the other map contents may include at least one of road names and names of points of interest in the other map contents. After the planned road names in the navigation route are loaded to the navigation map, the step of performing the collision detecting on the annotations of other map contents may include: performing collision detecting on the annotations of other map contents and the planned road names loaded onto the navigation map, and loading annotations not overlapping or intersecting with the planned road names loaded onto the navigation map onto the navigation map; and for every annotation overlapping or intersecting with the planned road names loaded onto the navigation map, probing and loading annotations having higher priority levels first and then probing and loading annotations having lower priority levels in an order of priority levels from high to low. Specifically, if an annotation overlapping or intersecting with the planned road names loaded onto the navigation map is a road name, the road name is probed along a road. If a loading position is found, the road name will be loaded onto the navigation map; and if the loading position cannot be found, the road name will not be loaded. If an annotation overlapping or intersecting with the planned road names loaded onto the navigation map is a name of a point of interest, probing is performed in a region of the point of interest. If a loading position is found, the name of the point of interest will be loaded onto the navigation map; and if the loading position cannot be found, the name of the point of interest will not be loaded.

In the embodiment of the present disclosure, the collision detecting and the loading are first performed on the planned road names in the navigation route, and the collision detecting and the loading are then performed on the annotations of other map contents, which ensures the display for the planned road names in a navigation map, and solves a problem concerned with by users that the planned road names may not be displayed on the navigation map, thereby improving guidance of map display for navigation.

Second Embodiment

Figure 3:
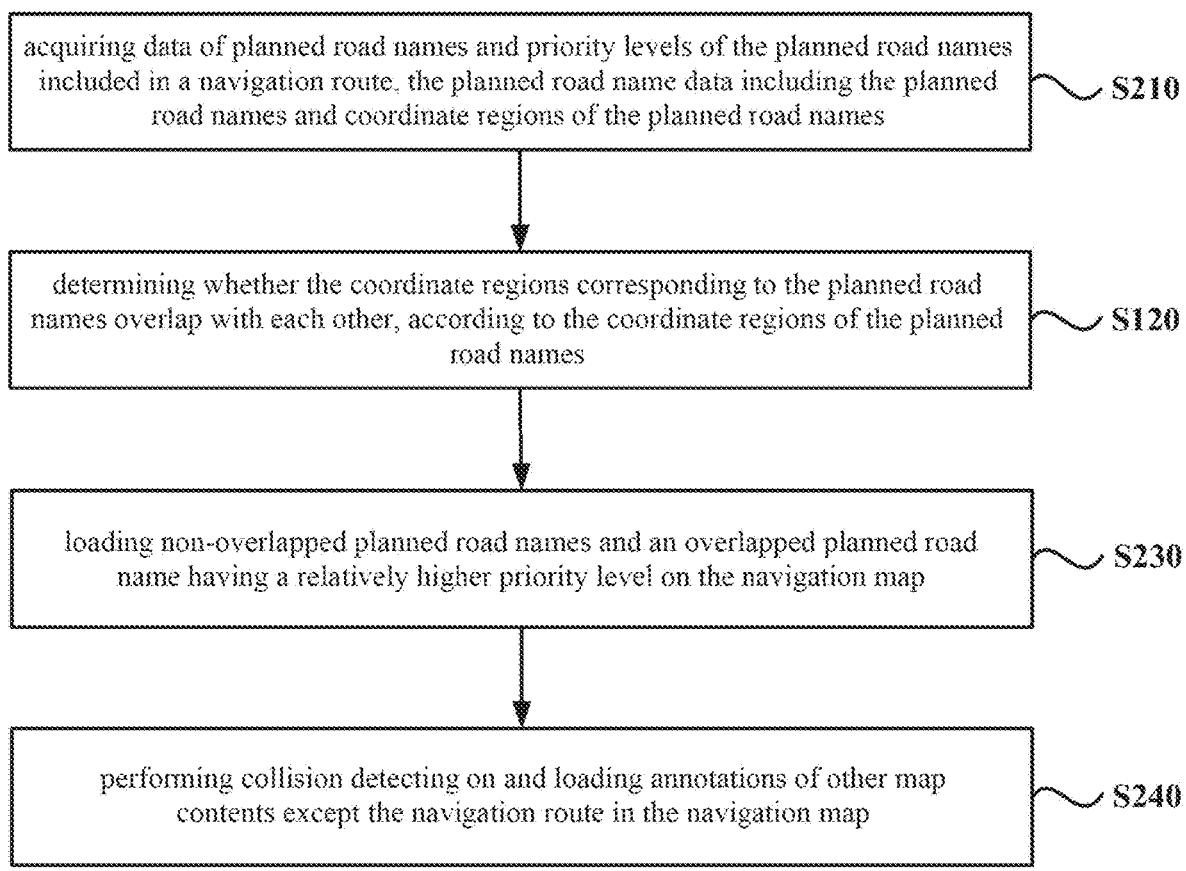
FIG. 3 is a flowchart of a method for displaying road names provided by a second embodiment of the present disclosure.

This embodiment is a specific implementation provided on the basis of the first embodiment. FIG. 3 is a flowchart of a method for displaying road names provided by a second embodiment of the present disclosure. Referring to FIG. 3, the method for displaying road names provided by the present embodiment includes the following steps.

S210, acquiring data of planned road names and priority levels of the planned road names included in a navigation route, the planned road name data including the planned road names and coordinate regions of the planned road names.

S220, determining whether the coordinate regions corresponding to the planned road names overlap with each other, according to the coordinate regions of the planned road names.

Specifically, if a coordinate region corresponding to a planned road name overlaps or intersects with coordinate regions corresponding to other planned road names in the navigation map, it is determined that the coordinate region corresponding to the planned road name overlap with each other; otherwise, it is determined that the coordinate region corresponding to the planned road name do not overlap with each other.

S230, loading non-overlapped planned road names and an overlapped planned road name having a relatively higher priority level on the navigation map.

A planned road name having a relatively higher priority level in the overlapped planned road names is a road name having a highest priority level in the planned road names of the coordinate regions having overlaps. Specifically, assuming there are five planned road names, namely, a first planned road name, a second planned road name, a third planned road name, a fourth planned road name and a fifth planned road name, and priority levels of the five planned road names decrease in sequence from the first planned road name to the fifth planned road name. If coordinate regions of the first planned road name and the second planned road name do not overlap or intersect with coordinate regions of other planned road names, the first planned road name and the second planned road name are loaded onto the navigation map. If there is an overlap or an intersection among the third planned road name, the fourth planned road name and the fifth planned road name, the third planned road name having a relatively highest priority level is loaded onto the navigation map.

In order to load as many planned road names as possible onto the navigation map and improve guidance for navigation, after loading non-overlapped planned road names and an overlapped planned road name having a relatively higher priority level on the navigation map, the method may further include: probing a planned road name having a relatively lower priority level in the overlapped planned road names along a planned road included in the navigation route; and loading the planned road name having the relatively lower priority level if a loading position is probed.

Figure 4:
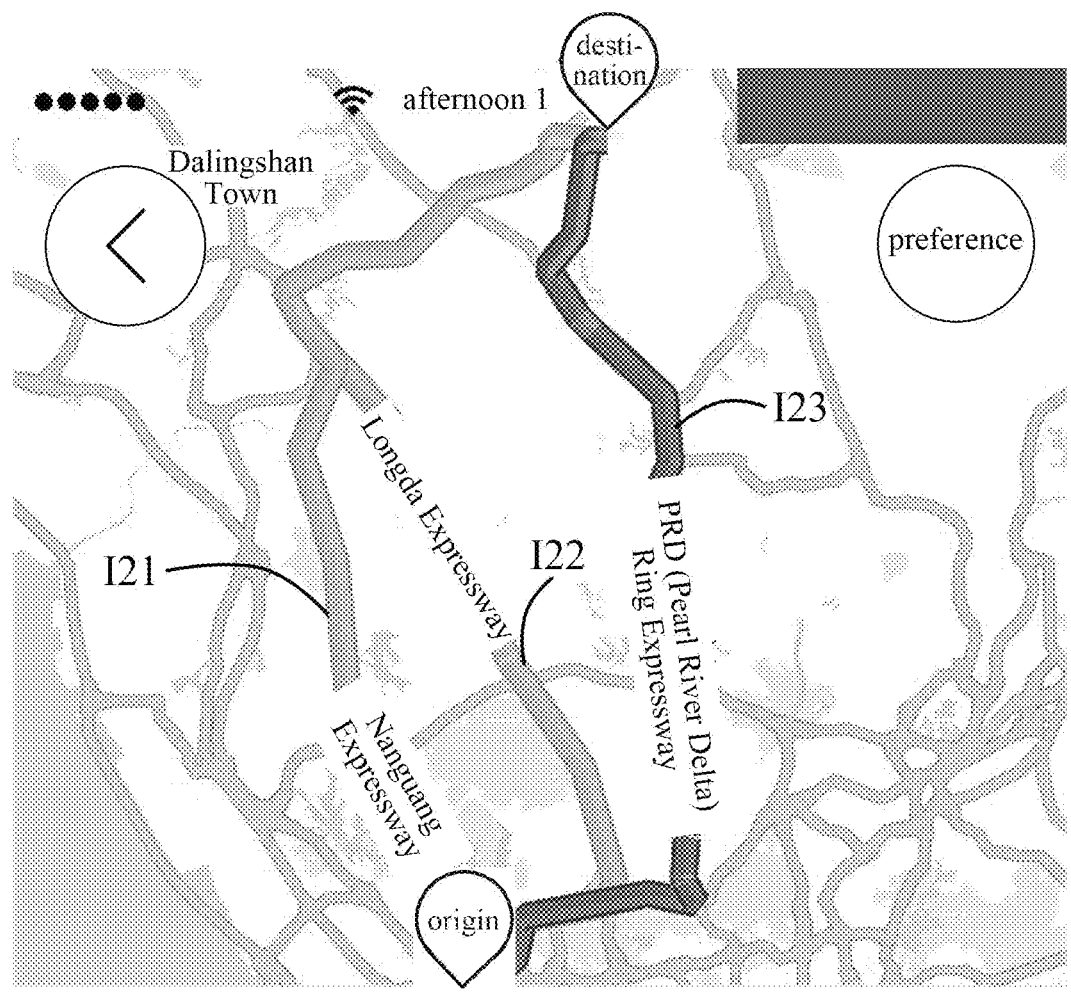
FIG. 4 is a schematic diagram of an effect of the method for displaying road names provided by the second embodiment of the present disclosure.

Specifically, for the planned road name having the relatively lower priority level in the overlapped planned road names, the planned road name is probed along the road according to the priority level. If a position not overlapping or intersecting with the coordinate regions of the planned road names loaded onto the navigation map is detected, the detected position is determined as the loading position, and the planned road name is loaded onto the loading position of the navigation map. Otherwise, the probing along the road is continued. If the loading position fails to be detected after a whole planned road is probed, the loading for the planned road name is abandoned. Specifically, for the fourth planned road name and fifth planned road name having relatively lower priority levels in the overlapped planned road names, the fourth planned road name having a relatively higher priority level is first probed along a fourth planned road. If a loading position is detected, the fourth planned road name is loaded onto the loading position of the navigation map. Otherwise, the probing along the fourth planned road is continued. If the loading position fails to be detected after the whole fourth planned road is probed, the loading for the fourth planned road name is abandoned. Then, the fifth planned road name having a relatively lower priority level is probed along a fifth planned road. If a loading position is detected, the fifth planned road name is loaded onto the loading position of the navigation map. Otherwise, the probing along the fifth planned road is continued. If the loading position fails to be detected after the whole fifth planned road is probed, the loading for the fifth planned road name is abandoned. As shown in FIG. 4, names of planned roads 121, 122 and 123 are loaded onto the navigation map, and displayed by a terminal device.

S240, performing collision detecting on and loading annotations of other map contents, wherein the other map contents are map contents in a navigation map except the navigation route.

According to the technical solution of this embodiment, the planned road names having relatively higher priority levels in the non-overlapped planned road names and overlapped planned road names are first loaded onto the navigation map, which ensures loading for planned road names having high priority levels in planned road names.

Third Embodiment

Figure 5:
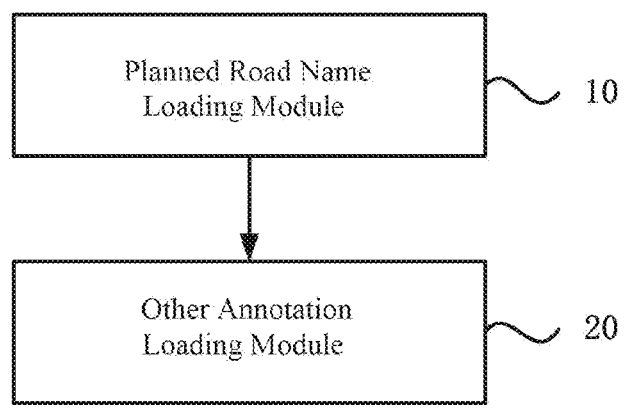
FIG. 5 is a schematic structural diagram of an apparatus for displaying road names provided by a third embodiment of the present disclosure.

FIG. 5 is a schematic structural diagram of an apparatus for displaying road names provided by a third embodiment of the present disclosure. This embodiment may be suitable for a situation in which annotations for map contents are loaded in a navigation process. Referring to FIG. 5, the apparatus for displaying road names provided by this embodiment includes a planned road name loading module 10 and an other annotation loading module 20.

The planned road name loading module 10 may be configured to perform collision detecting on and load planned road names according to planned road name data and priority levels of the planned road names included in a navigation route. The other annotation loading module 20 may be configured to perform collision detecting on and load annotations of other map contents, wherein the other map contents are map contents in a navigation map except the navigation route.

Preferably, the planned road name loading module 10 may include a data acquiring unit and a road name loading unit.

The data acquiring unit may be configured to acquire the planned road name data and the priority levels of the planned road names included in the navigation route, the planned road name data including the planned road names and coordinate regions of the planned road names. The road name loading unit may be configured to perform the collision detecting on and loading the planned road names according to the coordinate regions of the planned road names and the priority levels of the planned road names.

Further, the road name loading unit may include an overlap detecting subunit and a first loading subunit.

The overlap detecting subunit may be configured to determine whether the coordinate regions corresponding to the planned road names overlap with each other, according to the coordinate regions of the planned road names. The first loading subunit may be configured to load non-overlapped planned road names and an overlapped planned road name having a relatively higher priority level on the navigation map.

Alternatively, the road name loading unit may further include a probing subunit and a second loading subunit. The probing subunit may be configured to probe a planned road name having a relatively lower priority level in the overlapped planned road names along a planned road included in the navigation route, after loading non-overlapped planned road names and an overlapped planned road name having a relatively higher priority level on the navigation map. The second loading subunit may be configured to load the planned road name having the relatively lower priority level if a loading position is probed.

Specifically, the annotations of the other map contents may include at least one of a road name and a point of interest name of the other map contents.

The apparatus for displaying road names provided by this embodiment and the method for displaying road names provided by any embodiment of the present disclosure belong to the same inventive concept. The apparatus may perform the method for displaying road names provided by any embodiment of the present disclosure, and possess corresponding functional modules for performing the method for displaying road names and corresponding beneficial effects. For technical details not described in this embodiment, reference may be made to the method for displaying road names provided by any embodiment of the present disclosure.

Fourth Embodiment

A fourth embodiment of the present disclosure provides a terminal including the apparatus for displaying road names provided by any embodiment of the present disclosure.

Figure 6:
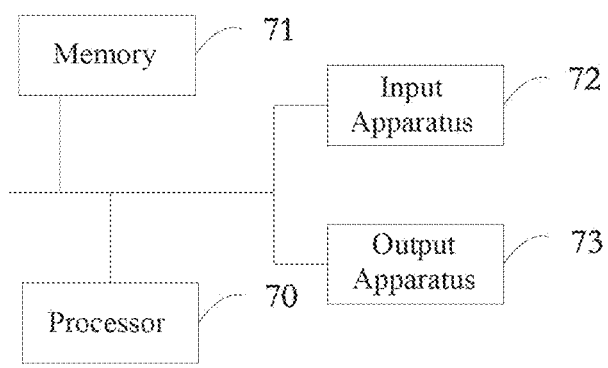
FIG. 6 is a schematic structural diagram of a terminal provided by a fourth embodiment of the present disclosure.

Specifically, as shown in FIG. 6, the embodiment of the present disclosure provides a terminal. The terminal includes a processor 70, a memory 71, an input apparatus 72 and an output apparatus 73. In the terminal, a number of processors 70 may be one or more, and in FIG. 6, one processor 70 is taken as an example. The processor 70, the memory 71, the input apparatus 72 and the output apparatus 73 may be connected via a bus or other manners. FIG. 6 takes the connection via a bus as an example.

As a computer readable storage medium, the memory 71 may be used for storing software programs, computer executable programs and modules, for example, program instructions/modules corresponding to the method for displaying road names in the embodiments of the present disclosure (for example, the planned road name loading module 10 and the other annotation loading module 20 in the apparatus for displaying road names). The processor 70 runs the software programs, instructions, and modules stored in the memory 71 to perform various functional applications and data processing of the terminal, so as to implement the method for displaying road names.

The memory 71 may include a program storage area and a data storage area. The program storage area may store an operating system and an application program for at least one function. The data storage area may store data created according to the use of the terminal, and so on. In addition, the memory 71 may include a high speed random access memory, and may further include a non-volatile memory, for example, at least one magnetic disk storage device, a flash memory device, or other non-volatile solid-state storage devices. In some embodiments, the memory 71 may further include memories disposed remote to the processor 70. These remote memories may be connected to the terminal through a network. Examples of the network include, but not limited to, internet, an enterprise intranet, a local area network, a mobile communication network, and a combination thereof.

The input apparatus 72 may be used for receiving input digital or character information, and generating key signal inputs related to user settings of the terminal and functional controls. The output apparatus 73 may include a display screen or other display devices.

The embodiments of the present disclosure further provide a storage medium including computer executable instructions. The computer executable instructions, when being executed by a computer processor, perform a method for displaying road names, comprising:

performing collision detecting on and loading planned road names according to planned road name data and priority levels of the planned road names included in a navigation route; and performing collision detecting on and loading annotations of other map contents, wherein the other map contents are map contents in a navigation map except the navigation route.

According to the descriptions of the above embodiments, one skilled in the art may clearly understand that the present disclosure may be implemented by means of software and necessary general-purpose hardware, and may be implemented, obviously, by means of hardware. However, the former is a preferred implementation in most cases. Based on such an understanding, the technical solutions of the present disclosure, or the part contributing to the prior art may be essentially embodied in the form of a software product. The computer software product may be stored in a computer readable storage medium, such as a soft disk, a read-only memory (ROM), a random access memory (RAM), a flash memory (FLASH), a hard disk or an optical disk, etc., and includes several instructions for enabling a computer device (which may be a personal computer, a server, a network device, or the like) to perform the method described in each embodiment of the present disclosure.

It should be noted that, in the above embodiment of the apparatus for displaying road names, the referred units and modules are merely divided according to a functional logic, but the present disclosure is not limited to the above division manner, as long as the corresponding functions may be achieved. In addition, the specific names of the functional units are merely used for distinguishing, and are not intended to limit the scope of the present disclosure.

The above descriptions are merely specific embodiments of the present disclosure, and the scope of the present disclosure is not limited thereto. Any changes or replacements that can be easily conceived of by one skilled in the art within the technical scope disclosed by the present disclosure should be covered by the scope of the present disclosure. Therefore, the scope of the present disclosure should be interpreted as the scope sought to be protected by the claims.

What is claimed is:

1. A method for displaying road names on an overview page of a navigation map, comprising:

acquiring planned road name data and priority levels of the planned road names included in a navigation route, the planned road name data including the planned road names and coordinate regions of the planned road names on the navigation map;

determining whether the coordinate regions of the planned road names interact with each other, according to the coordinate regions of the planned road names;

loading a planned road name with a coordinate region not intersecting with coordinate regions of other planned road names onto the overview page of the navigation map, and loading a planned road name having a relatively higher priority level in the other planned road names with coordinate regions intersecting with each other onto the overview page of the navigation map;

for a planned road name having a relatively lower priority level in the other planned road names with coordinate regions intersecting with each other, performing following operations:

probing along a planned road included in the navigation route to probe for a position for the planned road name having the relatively lower priority level in the other planned road names with coordinate regions intersecting with each other, wherein in response to determining that a position not intersecting with the coordinate regions of the planned road names loaded onto the overview page of the navigation map is detected along the planned road, determining the detected position as a loading position and loading the planned road name having the relatively lower priority level onto the determined loading position on the overview page of the navigation map; and in response to determining that the position not intersecting with the coordinate regions of the planned road names loaded onto the overview page of the navigation map is not detected after a whole length of the planned road is probed, abandoning loading of the planned road name having the relatively lower priority level onto the overview page of the navigation map, displaying the overview page of the navigation map on a terminal device, wherein the method is performed by at least one hardware processor.

2. The method according to claim 1, wherein the method further comprises:

after the planned road names in the navigation route are loaded onto the overview page of the navigation map, performing collision detecting on annotations of other map contents and the planned road names loaded onto the overview page of the navigation map, and loading annotations not intersecting with the planned road names loaded onto the overview page of the navigation map onto the overview page of the navigation map, wherein the other map contents are map contents in a navigation map except the navigation route.

3. The method according to claim 1, wherein the annotations of the other map contents comprise at least one of a road name and a point of interest name of the other map contents.

4. An apparatus for displaying road names on an overview page of a navigation map, comprising:
- at least one processor; and
- a memory storing instructions, which when executed by the at least one processor, cause the at least one processor to perform operations, the operations comprising:
- acquiring planned road name data and priority levels of the planned road names included in a navigation route, the planned road name data including the planned road names and coordinate regions of the planned road names on the navigation map;
- determining whether the coordinate regions of the planned road names interact with each other, according to the coordinate regions of the planned road names;
- loading a planned road name with a coordinate region not intersecting with coordinate regions of other planned road names onto the overview page of the navigation map, and loading a planned road name having a relatively higher priority level in the other planned road names with coordinate regions intersecting with each other onto the overview page of the navigation map;
- for a planned road name having a relatively lower priority level in the other planned road names with coordinate regions intersecting with each other, performing following operations;
- probing along a planned road included in the navigation route to probe for a position for the planned road name having the relatively lower priority level in the other planned road names with coordinate regions intersecting with each other, wherein
  - in response to determining that a position not intersecting with the coordinate regions of the planned road names loaded onto the overview page of the navigation map is detected along the planned road, determining the detected position as a loading position and loading the planned road name having the relatively lower priority level onto the determined loading position on the overview page of the navigation map; and
  - in response to determining that the position not intersecting with the coordinate regions of the planned road names loaded onto the overview page of the navigation map is not detected after a whole length of the planned road is probed, abandoning loading of the planned road name having the relatively lower priority level onto the overview page of the navigation map,
- displaying the overview page of the navigation map on a terminal device.

5. The apparatus according to claim 4, wherein the operations further comprise:

after the planned road names in the navigation route are loaded onto the overview page of the navigation map, performing collision detecting on annotations of other map contents and the planned road names loaded onto the overview page of the navigation map, and loading annotations not intersecting with the planned road names loaded onto the overview page of the navigation map onto the overview page of the navigation map, wherein the other map contents are map contents in a navigation map except the navigation route.

6. The apparatus according to claim 4, wherein the annotations of the other map contents comprise at least one of a road name and a point of interest name of the other map contents.

7. A non-transitory computer storage medium storing a computer program, which when executed by one or more processors, causes the one or more processors to perform operations for displaying road names on an overview page of a navigation map, the operations comprising:
- acquiring planned road name data and priority levels of the planned road names included in a navigation route, the planned road name data including the planned road names and coordinate regions of the planned road names on the navigation map;
- determining whether the coordinate regions of the planned road names interact with each other, according to the coordinate regions of the planned road names;
- loading a planned road name with a coordinate region not intersecting with coordinate regions of other planned road names onto the overview page of the navigation map, and loading a planned road name having a relatively higher priority level in the other planned road names with coordinate regions intersecting with each other onto the overview page of the navigation map;
- for a planned road name having a relatively lower priority level in the other planned road names with coordinate regions intersecting with each other, performing following operations:
- probing, along a planned road included in the navigation route to probe for a position for the planned road name having the relatively lower priority level in the other planned road names with coordinate regions intersecting with each other, wherein
  - in response to determining that a position not intersecting with the coordinate regions of the planned road names loaded onto the overview page of the navigation map is detected along the planned road, determining the detected position as a loading position; and loading the planned road name having the relatively lower priority level onto the determined loading position on the overview page of the navigation map; and
  - in response to determining that the position not intersecting with the coordinate regions of the planned road names loaded onto the overview page of the navigation map is not detected after a whole length of the planned road is probed, abandoning loading of the planned road name having the relatively lower priority level onto the overview page of the navigation map,
- displaying the overview page of the navigation map on a terminal device.

* * * * *

UNITED STATES PATENT AND TRADEMARK OFFICE
CERTIFICATE OF CORRECTION

PATENT NO. : 11,473,926 B2  
APPLICATION NO. : 16/146313  
DATED : October 18, 2022  
INVENTOR(S) : Deng et al.

Page 1 of 1

It is certified that error appears in the above-identified patent and that said Letters Patent is hereby corrected as shown below:

In the Claims

In Column 9, Claim 4, Line 37, delete "operations;" and insert --operations:--.

Signed and Sealed this
Twenty-seventh Day of August, 2024

Katherine Kelly Vidal  
*Director of the United States Patent and Trademark Office*